(12) United States Patent
Beaurepaire et al.

(10) Patent No.: US 9,014,914 B2
(45) Date of Patent: Apr. 21, 2015

(54) METHOD AND APPARATUS FOR ESTABLISHING A COMMUNICATION SESSION BETWEEN PARKED VEHICLES TO DETERMINE A SUITABLE PARKING SITUATION

(71) Applicant: Nokia Corporation, Espoo (FI)

(72) Inventors: Jerome Beaurepaire, Berlin (DE); Ari Aarnio, Espoo (FI)

(73) Assignee: Here Global B.V., Veldhoven (NL)

( * ) Notice: Subject to any disclaimer, the term of this patent is extended or adjusted under 35 U.S.C. 154(b) by 86 days.

(21) Appl. No.: 13/860,273

(22) Filed: Apr. 10, 2013

(65) Prior Publication Data

US 2014/0309917 A1  Oct. 16, 2014

(51) Int. Cl.
*G08G 1/123* (2006.01)
*G08G 1/017* (2006.01)
*G08G 1/14* (2006.01)
*G08G 1/00* (2006.01)

(52) U.S. Cl.
CPC ............... *G08G 1/123* (2013.01); *G08G 1/017* (2013.01); *G08G 1/142* (2013.01); *G08G 1/144* (2013.01); *G08G 1/207* (2013.01)

(58) Field of Classification Search
CPC .......... G06G 1/14; G06G 1/144; G60Q 50/30
See application file for complete search history.

(56) References Cited

U.S. PATENT DOCUMENTS

| | | | |
|---|---|---|---|
| 6,370,471 B1 | 4/2002 | Lohner et al. | |
| 6,820,709 B1 | 11/2004 | Zimmermann et al. | |
| 2010/0082230 A1* | 4/2010 | Hong et al. | 701/201 |
| 2011/0140952 A1* | 6/2011 | Kemkemian et al. | 342/146 |
| 2012/0095812 A1* | 4/2012 | Stefik et al. | 705/13 |
| 2012/0286974 A1 | 11/2012 | Claussen et al. | |
| 2014/0019174 A1* | 1/2014 | Bhatt | 705/5 |
| 2014/0184428 A1* | 7/2014 | Healey et al. | 340/932.2 |

FOREIGN PATENT DOCUMENTS

| | | | |
|---|---|---|---|
| DE | 4243522 A1 | * | 6/1994 |
| EP | 0 446 163 A1 | | 9/1991 |
| ES | 2334194 A1 | | 3/2010 |
| JP | 9-35102 A | | 2/1997 |

OTHER PUBLICATIONS

Bi et al., "A Parking Management System Based on Wireless Sensor Network," vol. 32, No. 6, pp. 968-977, Nov. 2006, Acta Automatica Sinica.

Nouveliere, L. et al. "Experimental Vehicle Longitudinal Control using Second Order Sliding Modes." <http://ieeexplore.ieee.org/xpl/mostRecentIssue.jsp?8775> Date of Conference: Jun. 4-6, 2003, Published in American Control Conference, 2003, Proceedings of the 2003 (vol. 6), pp. 4705-4710. ISSN: 0743-1619.

* cited by examiner

*Primary Examiner* — Michael J Zanelli
(74) *Attorney, Agent, or Firm* — Ditthavong & Steiner, P.C.

(57) ABSTRACT

An approach is provided for causing, at least in part, a sensing of information with at least one sensor, wherein the information is associated with at least one anticipated movement of the at least one parked vehicle. The approach also involves processing and/or facilitating a processing of the information to determine one or more conditions of the at least one anticipated movement of the at least one parked vehicle. The approach further involves causing, at least in part, an initiation of at least one action based, at least in part, on the one or more conditions, the at least one anticipated movement, or a combination thereof.

18 Claims, 16 Drawing Sheets

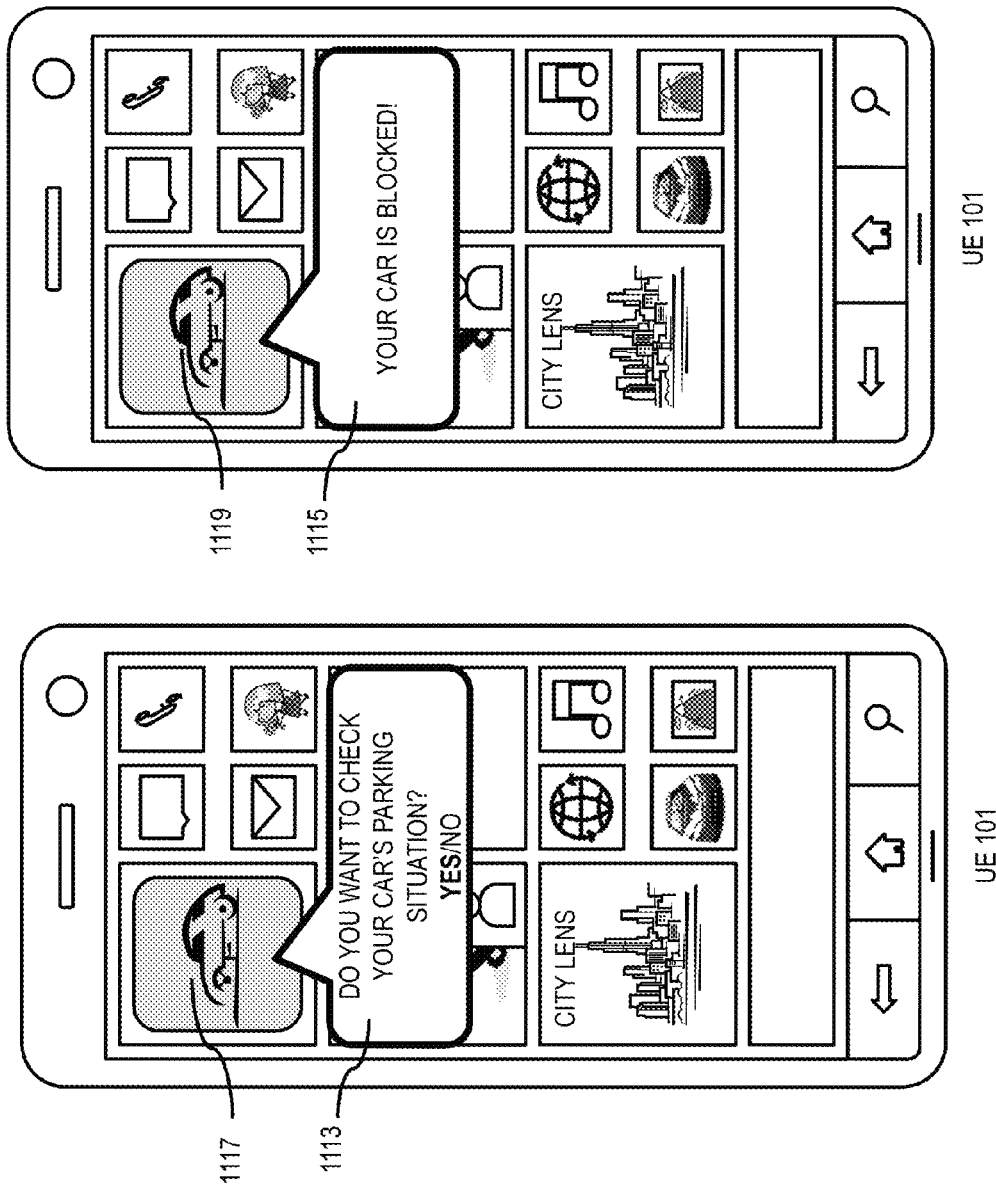

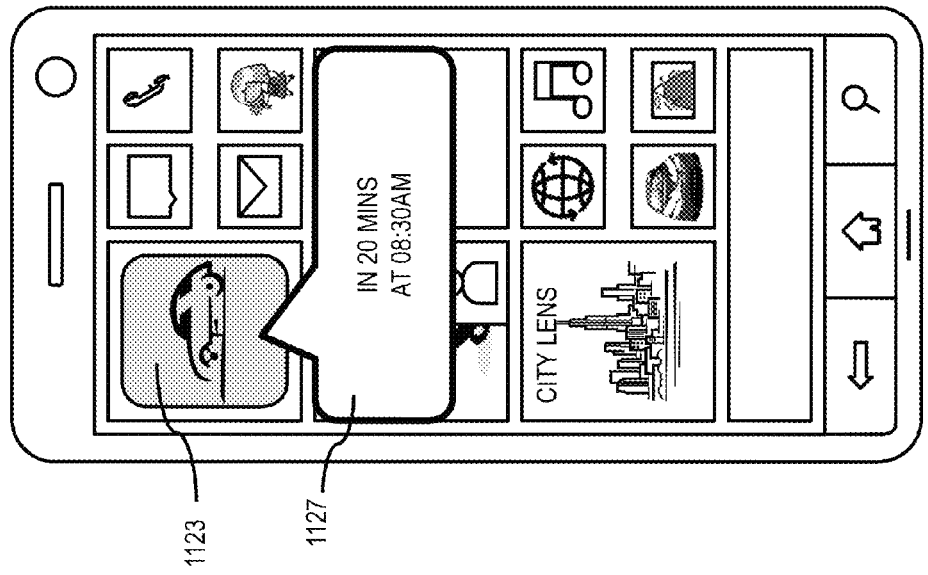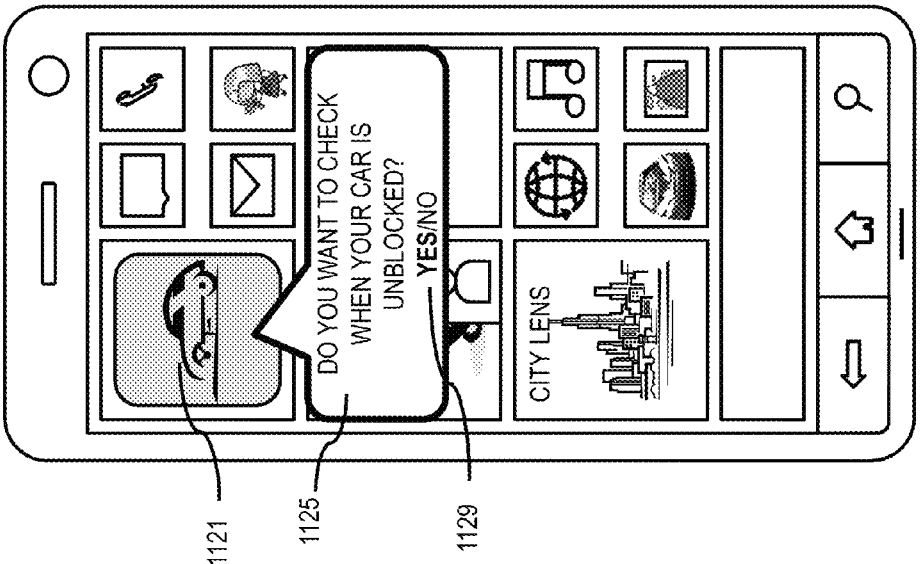
FIG. 11 C

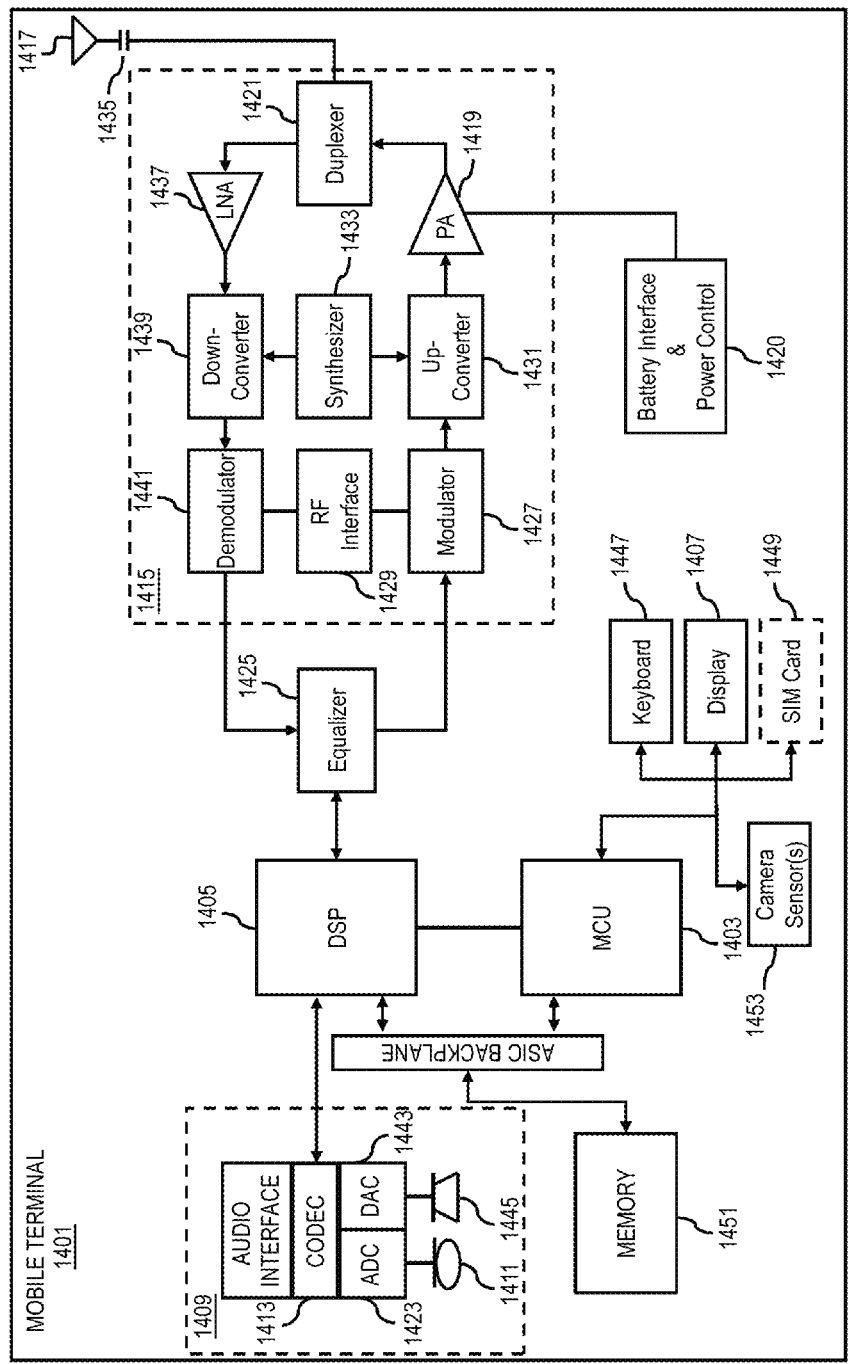

METHOD AND APPARATUS FOR ESTABLISHING A COMMUNICATION SESSION BETWEEN PARKED VEHICLES TO DETERMINE A SUITABLE PARKING SITUATION

BACKGROUND

Service providers and device manufacturers (e.g., wireless, cellular, etc.) are continually challenged to deliver value and convenience to consumers by, for example, providing compelling network services. One area of development has been the use of location-based services for providing the users of mobile devices with driving assistant services to improve the quality of their travels. However, at present there is no service that determines the anticipated movement of the parked vehicles at the at least one parking location, and communicates the determined conflict information among the parked vehicles, thereby recommending the most suitable parking situation.

SOME EXAMPLE EMBODIMENTS

Therefore, there is a need for an approach for determining one or more conditions of the at least one anticipated movement of the at least one parked vehicle.

According to one embodiment, a method comprises causing, at least in part, a sensing of information with at least one sensor, wherein the information is associated with at least one anticipated movement of the at least one parked vehicle. The method also comprises processing and/or facilitating a processing of the information to determine one or more conditions of the at least one anticipated movement of the at least one parked vehicle. The method further comprises causing, at least in part, an initiation of at least one action based, at least in part, on the one or more conditions, the at least one anticipated movement, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a sensing of information with at least one sensor, wherein the information is associated with at least one anticipated movement of the at least one parked vehicle. The apparatus is also caused to process and/or facilitate a processing of the information to determine one or more conditions of the at least one anticipated movement of the at least one parked vehicle. The apparatus further causes, at least in part, an initiation of at least one action based, at least in part, on the one or more conditions, the at least one anticipated movement, or a combination thereof.

According to another embodiment, a computer-readable storage medium carries one or more sequences of one or more instructions which, when executed by one or more processors, cause, at least in part, an apparatus to cause, at least in part, a sensing of information with at least one sensor, wherein the information is associated with at least one anticipated movement of the at least one parked vehicle. The apparatus also causes a processing and/or facilitating a processing of the information to determine one or more conditions of the at least one anticipated movement of the at least one parked vehicle. The apparatus further causes, at least in part, an initiation of at least one action based, at least in part, on the one or more conditions, the at least one anticipated movement, or a combination thereof.

According to another embodiment, an apparatus comprises means for causing, at least in part, a sensing of information with at least one sensor, wherein the information is associated with at least one anticipated movement of the at least one parked vehicle. The apparatus also comprises means for processing and/or facilitating a processing of the information to determine one or more conditions of the at least one anticipated movement of the at least one parked vehicle. The apparatus further comprises means for causing, at least in part, an initiation of at least one action based, at least in part, on the one or more conditions, the at least one anticipated movement, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 14 is a diagram of a mobile terminal (e.g., handset) that can be used to implement an embodiment of the invention.

DESCRIPTION OF SOME EMBODIMENTS

Examples of a method, apparatus, and computer program for determining one or more conditions of the at least one anticipated movement of the at least one parked vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
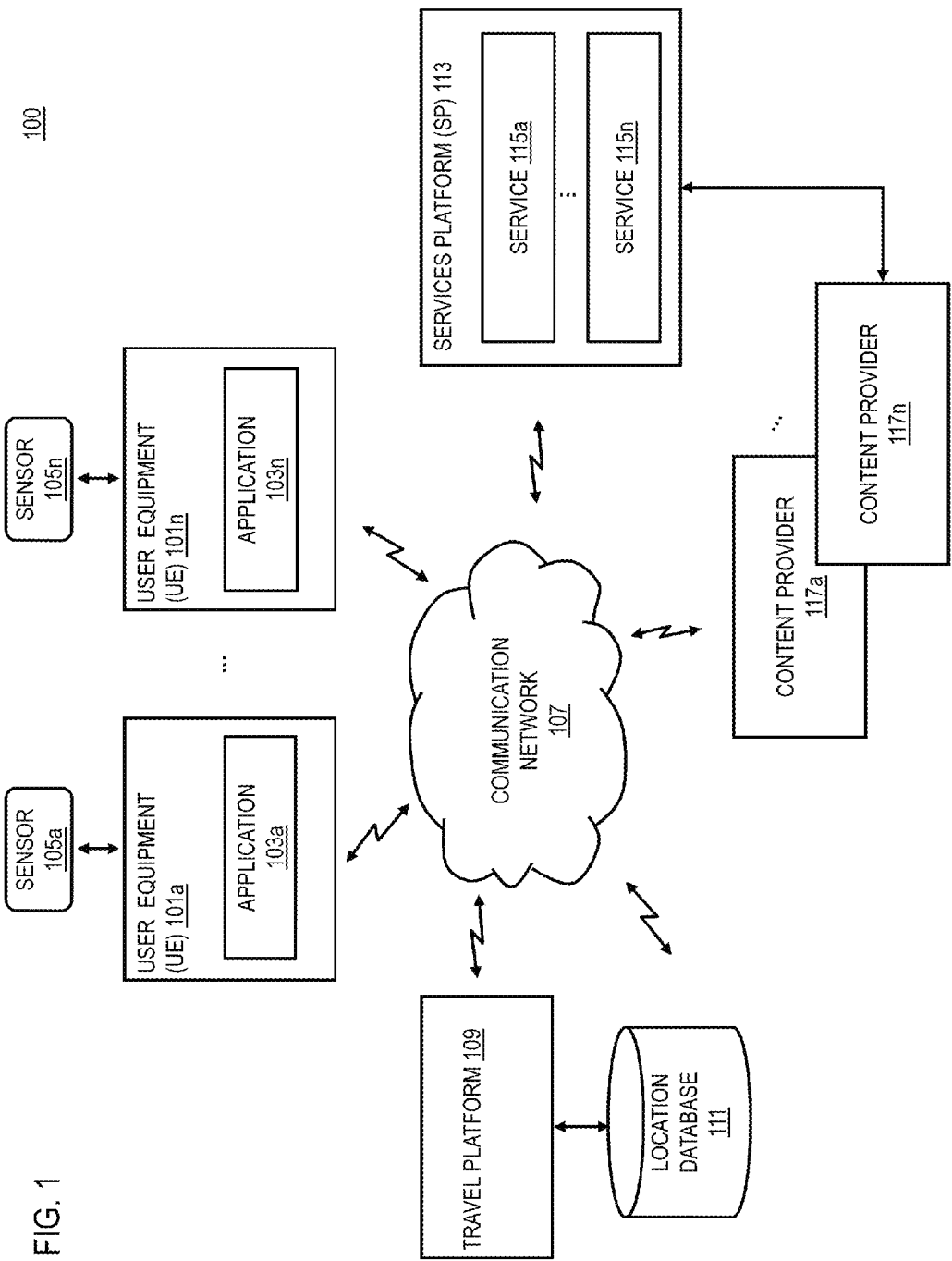
FIG. 1 is a diagram of a system capable of determining one or more conditions of the at least one anticipated movement of the at least one parked vehicle, according to one embodiment.

FIG. 1 is a diagram of a system capable of determining one or more conditions of the at least one anticipated movement of the at least one parked vehicle, according to one embodiment. The service providers and device manufacturers (e.g., wireless, cellular, etc.) are continually challenged to provide compelling network services, that may include, optimizing the parking location by helping users to select the most suitable parking space, for instance, guiding to a parking space next to users planning to leave before or around the same time. At present, there is no service that informs a driver of the at least one vehicle about any other vehicle blocking his/her pathway at important times. Further, there is a need to allow vehicles to temporarily block other vehicles upon a determination that the blocked vehicles do not need to be used for the time it is being blocked. The existing solution for the discussed problems is for the driver to check in person whether his/her vehicle is being blocked. In one scenario, a driver may park by order of his/her arrival and when the driver needs to leave the parking location, the driver may find his/her vehicle being blocked by an improperly parked other vehicle, whereby the driver needs to request the other driver to move his/her respective vehicle, in order for the driver to leave the parking location. This process is cumbersome and time consuming.

To address this problem, a system 100 of FIG. 1 may initially cause, at least in part, an establishment of at least one communication session between the at least one device associated with the one or more vehicles at the at least one parking location upon processing of the sensors information and determining at least one obstruction representing at least one potential conflict. In one embodiment, the travel platform 109 may determine proximity information for the one or more vehicles at the at least one parking location, and cause, at least in part, a negotiation among the one or more vehicles in relation to the parking location over the at least one communication session.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a travel platform 109 via the communication network 107. In one embodiment, the travel platform 109 performs one or more functions associated with determining one or more conditions of the at least one anticipated movement of the at least one parked vehicle.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for travel platform 109 and perform one or more functions associated with the functions of the travel platform 109 by interacting with the travel platform 109 over communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.). It is contemplated that sensors 105 includes one or more components for determining that at least one other parked vehicle is an obstruction to the at least one parked vehicle. In one embodiment, the sensors 105 may detect the status of parking space and transmits the information through the communication module 205. The sensors 105 may receive instructions from the travel platform 109 to carry out procedures such as time synchronizing, parking status reporting and so on. In one scenario, the sensors may provide information on proximity information between one or more vehicles in the at least one parking location.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the travel platform 109 may be a platform with multiple interconnected components. The travel platform 109 may include multiple servers, intelligent networking devices, computing devices, components and corresponding software for determining one or more conditions of the at least one anticipated movement of the at least one parked vehicle. In addition, it is noted that the travel platform 109 may be a separate entity of the system 100, a part of the one or more services 115 of the service platform 113, or included within the UE 101 (e.g., as part of the applications 103).

In one embodiment, the travel platform 109 causes a sensing of information with at least one sensor, wherein the information is associated with at least one anticipated movement of the at least one parked vehicle. The travel platform 109 processes sensor information associated with at least one parked vehicle to determine proximity information for the one or more parked vehicles. The travel platform 109 then determines whether the one or more parked vehicle is causing an obstruction, whereby the travel platform 109 causes an establishment of at least one communication session between at least one device associated with the one or more parked vehicle for exchanging information to further determine whether the obstruction represents at least one potential conflict for an anticipated movement of the at least one parked vehicle, for instance, the travel platform 109 may query the information stores associated with the at least one parked vehicles and/or the at least one other parked vehicle for departure time information, whereby the travel platform 109 may processes the departure time information to determine at least one suitable parking location for the obstructing vehicle. The travel platform 109 causes a negotiation among the one or more parked vehicles to determine the most suitable parking location. In one embodiment, the travel platform 109 or parts of it may be in-built in a vehicle, whereby the equipment of a vehicle can reveal whether other vehicle is blocking the pathway for the vehicle to leave the parking location.

In one embodiment, the travel platform 109 causes a transmission of a request to present at least one notification, for instance, departure time information from at least one calendar information associated with at least one operator of that least one parked vehicle, to the at least one operator of the at least one other parked vehicle regarding the at least one obstruction and/or the at least one potential conflict. Subsequently, the travel platform 109 determines departure time information for the one or more parked vehicles and processes the departure time information to determine at least one suitable parking location for the obstructing vehicle. In another embodiment, the travel platform 109 processes the data received from the at least one device associated with the one or more parked vehicles during the communication session, thereby causing a recommendation of at least one parking location for minimization of a blocking of the one or more parked vehicles.

In one embodiment, the travel platform 109 causes an initiation of the processing of the sensors information and/or the departure time information based on a determination that an improper parking has occurred at the at least one parking location. In another embodiment, the travel platform 109 causes a presentation of at least one user interface element on the at least one device associated with the one or more parked vehicles upon determination that the at least one other parked vehicle is no longer obstructing the at least one parked vehicle.

In one embodiment, the location database 111 may include one or more contexts, one or more parameters, or a combination thereof associated with one or more parking location. By way of example, the travel platform 109 may use the one or more contexts, the one or more parameters, or a combination thereof stored within the location databases 111 to determine one or more relationships between the one or more parked vehicles in the at least one parking location. More specifically, the travel platform 109 may use the one or more contexts, the one or more parameters, or a combination thereof to determine a hierarchy (e.g., in terms of departure information of one or more vehicles) of the one or more parking location. As discussed, the UEs 101 may utilize location-based technologies (sensors, GPS receivers, etc.) to determine location and temporal information regarding the UEs 101. For instance, the UEs 101 may use sensors to obtain information on the proximity, orientations, etc. for the one or more parked vehicles.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the travel platform 109 and the content providers 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the travel platform 109 with travel information for the one or more vehicles.

The content providers 117 may provide content to the UE 101, the travel platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining the most suitable parking location. In one embodiment, the content providers 117 may also store content associated with the UE 101, the travel platform 109, and the services 115 of the services platform 113. In another embodiment, the content providers 117 may manage access to a central repository of data, and offer a consistent, standard interface to data, such as a repository of users' navigational data content.

By way of example, the UE 101, the travel platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
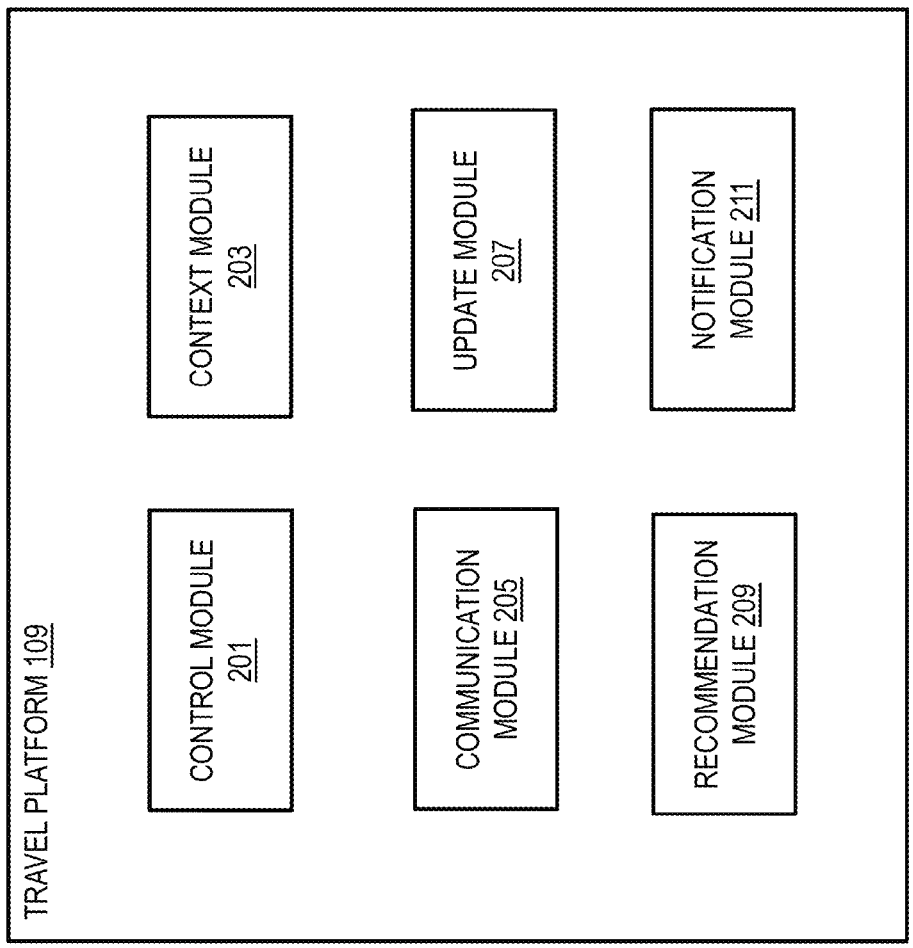
FIG. 2 is a diagram of the components of travel platform 109, according to one embodiment.

FIG. 2 is a diagram of the components of the travel platform 109, according to one embodiment. By way of example, the travel platform 109 includes one or more components for determining one or more conditions of the at least one anticipated movement of the at least one parked vehicle. It is contemplated that the functions of these components may be combined in one or more components or performed by other components of equivalent functionality. In this embodiment, the travel platform 109 includes a control module 201, a context module 203, a communication module 205, an update module 207, a recommendation module 209 and a notification module 211.

In one embodiment, the control module 201 executes at least one algorithm for executing functions of the travel platform 109. For example, the control module 201 may execute an algorithm for processing a query of one or more information stores associated with the at least one parked vehicle and/or the at least one other parked vehicle for determining departure time information from at least one parking location. By way of another example, the control module 201 may execute an algorithm to interact with the context module 203 to determine the geographic or temporal context of one or more vehicles. The control module 201 may also execute an algorithm to interact with the communication module 205 to communicate among applications 103, the travel platform 109, the services platform 113, content providers 117, and the location databases 111.

In one embodiment, the context module 203 may determine the geographic or temporal context of at least one vehicle or the device associated with the at least one vehicle by utilizing location-based technologies (sensors, GPS receivers etc.) to determine location (e.g., direction, angles) and temporal information (e.g., departure time) during parking at the at least one parking location. The context module 203 may also identify whether certain conditions or triggers have been met, such as whether a particular event has occurred (e.g., initiation of departure from the at least one parking location at the scheduled time). In one embodiment, the context module 203 may determine to store the one or more parking location, sensor information, departure time information or a combination thereof within the one or more location databases 111.

In one embodiment, the communication module 205 is used for communication between the applications 103, the travel platform 109, the services platform 113, content providers 117, and the location databases 111. The communication module 205 may be used to communicate commands, requests, data, etc. By way of example, the communication module 205 may be used to transit a request from a user interface (UI) of a UE 101 to obtain location-based information (e.g., sensor information, departure time information) for one or more vehicles. In one embodiment, the communication module 205 is used to present a user with location information obtained from one or more location databases 111 regarding one or more parking location. In one embodiment, the communication module 205 establishes a communication session among one or more vehicles associated with at least one parking location for querying one or more information stores associated with the at least one parked vehicle and/or the at least one other parked vehicle.

In one embodiment, the update module 207 may work with the context module 203 and the recommendation module 209 to cause, at least in part, an update of the at least one departure information, the one or more context, or a combination thereof periodically, according to a schedule, on demand, or a combination thereof for a predetermined period prior to and/or during and/or after a commencement of travel.

In addition, the context module 203 may work with the recommendation module 209 to generate a recommendation to a user of at least one alternate parking location based, at least in part, on travel information obtained by the context module 203. In particular, the context module 203 and the recommendation module 209 may work together in order to monitor location information for the one or more vehicles.

In one embodiment, the notification module 211 may work with the communication module 205 to cause a transmission of parking status to the at least one device associated with the one or more parked vehicles in the communication session. The notification module 211 may alert the drivers of the one or more parked vehicles regarding the at least one obstruction, at least one potential conflict, or a combination thereof. The notification module 211 may further provide information on departure time for the at least one parked vehicle.

Figure 3:
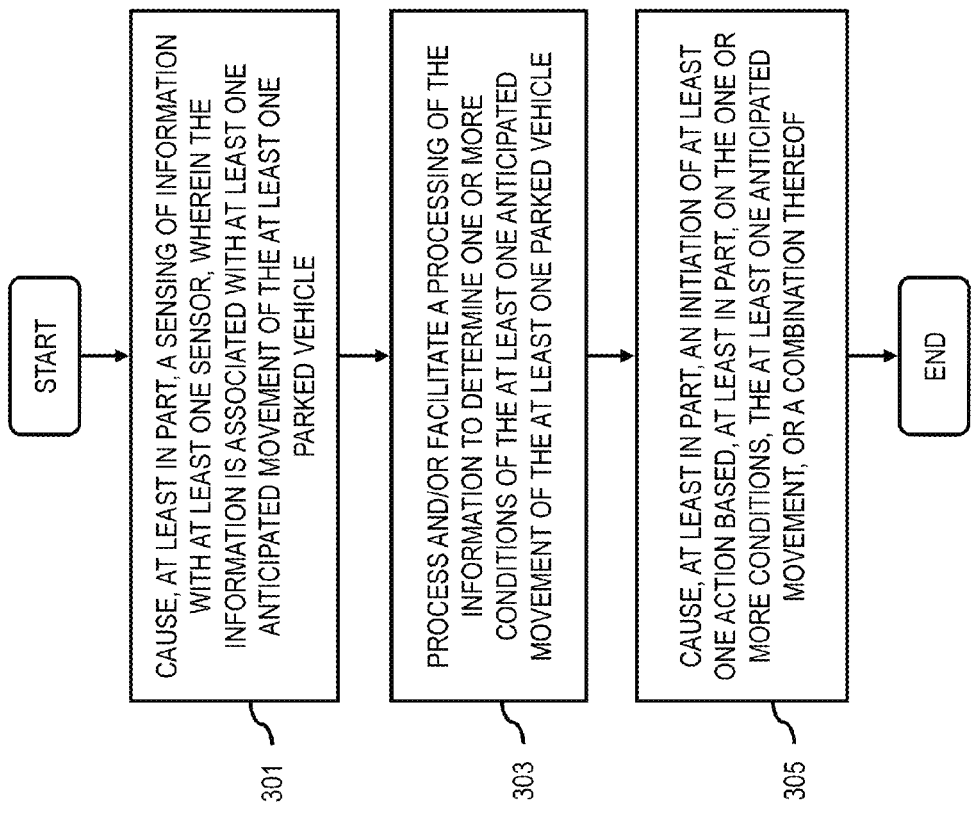
FIGS. 3-6 are flowcharts of processes for determining one or more conditions of the at least one anticipated movement of the at least one parked vehicle, according to various embodiments.
Figure 13:
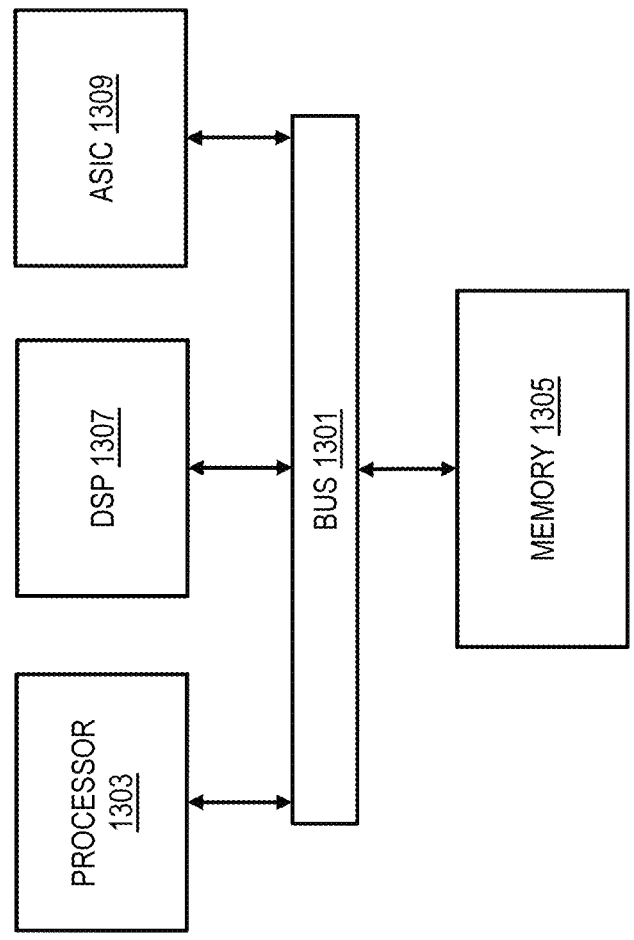
FIG. 13 is a diagram of a chip set that can be used to implement an embodiment of the invention.

FIG. 3 is a flowchart of a process for determining one or more conditions of the at least one anticipated movement of the at least one parked vehicle, according to one embodiment. In one embodiment, the travel platform 109 performs the process 300 and is implemented in, for instance, a chip set including a processor and a memory as shown in FIG. 13.

In step 301, the travel platform 109 causes, at least in part, a sensing of information with at least one sensor, wherein the information is associated with at least one anticipated movement of the at least one parked vehicle.

In step 303, the travel platform 109 processes and/or facilitates a processing of the information to determine one or more conditions of the at least one anticipated movement of the at least one parked vehicle. In one scenario, sensors 105 associated with the at least one parked vehicle may cause a sensing of the nearby conditions for an anticipated movement of the at least one parked vehicle, whereby the sensors 105 may provide the sensed information to the travel platform 109. Then, the travel platform 109 may process the sensed information to determine the anticipated movement of the at least one parked vehicle. In one scenario, the travel platform 109 may process the sensor information, for instance, proximity sensor information, camera sensor information, or a combination thereof, to determines that at least one other parked vehicle is an obstruction to the at least one parked vehicle. In one scenario, the travel platform 109 may cause an initiation of the processing of the proximity sensor information for the one or more parked vehicles to determine that an improper parking has occurred at the at least one parking location.

In step 305, the travel platform 109 causes, at least in part, an initiation of at least one action based, at least in part, on the one or more conditions, the at least one anticipated movement, or a combination thereof, wherein the at least one action includes, at least in part, (a) an establishment of at least one communication session between at least one device associated with the at least one parked vehicle and at least one other device associated with at least one other parked vehicle; or (b) a determination that that at least one communication session is not needed based, at least in part, on the one or more conditions. In one scenario, the travel platform 109 may determine that no communication is needed between the blocked vehicle and the obstructing vehicle because the obstructing vehicle is leaving the parking location before the scheduled departure time of the blocked vehicle.

Figure 4:
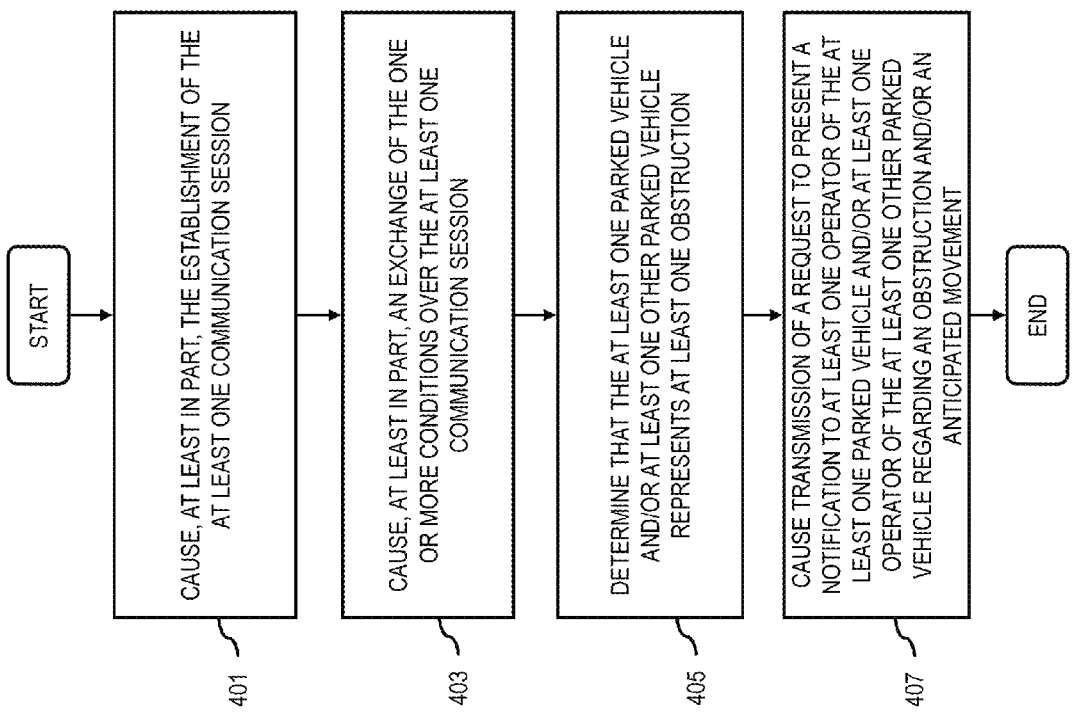

FIG. 4 is a flowchart of a process for determining at least one obstruction between on or more parked vehicles, according to one embodiment. In one embodiment, the travel platform 109 performs the process 400 and is implemented in, for instance, a chip set including a processor and a memory as shown in FIG. 13.

In step 401, the travel platform 109 causes, at least in part, an establishment of at least one communication session. In one scenario, the travel platform 109 may initiate a communication session between the parked vehicles based, at least in part, on a determination that an obstruction to the at least one parked vehicle by at least one other parked vehicle has occurred. In one scenario, a vehicle may be parked at a location blocking other vehicles from leaving the parking location, whereby the blocked vehicles may initiate a communication with the blocking vehicle.

In step 403, the travel platform 109 causes, at least in part, an exchange of the one or more conditions over the at least one communication session, wherein the one or more conditions are for determining one or more possibilities of the anticipated movement of the at least one parked vehicle. In one scenario, the travel platform 109 cause, at least in part, an exchange of information over the at least one communication session, wherein the information is for determining whether the at least one obstruction represents at least one potential conflict for an anticipated movement of the at least one parked vehicle. In one scenario, the travel platform 109 may determine that the at least on parked vehicle is blocked by the other parked vehicle, whereby the travel platform 109 queries the calendar information associated with the parked vehicles in the communication session for departure time information. In one scenario, the travel platform 109 may determine based, at least in part, on the departure information whether at least one potential conflict exists, for instance, a parked vehicle may be blocked by another parked vehicle but the travel platform 109 may determine there is no potential conflict in the parking situation because the blocking vehicle is leaving the parking location well ahead of the planned departure time of the blocked vehicle. In one scenario, the travel platform 109 may cause exchange of information, for instance, the vehicles being parked too close to each other, whereby the travel platform 109 may guide the driver of the obstructing vehicles to park their vehicles in another parking location.

In step 405, the travel platform 109 determines that the at least one parked vehicle, at least one other parked vehicle, or a combination thereof, represents at least one obstruction. In one scenario, the travel platform 109 determines sensors information and/or departure time information for the one or more parked vehicles, and processes the determined information to determine at least one obstruction. In one scenario, the travel platform 109 may cause a negotiation among the one or more vehicles in relation to the parking location over the at least one communication session. In one scenario, the travel platform 109 may cause, at least in part, a presentation of one or more guides for locating a suitable parking location, wherein the one or more guides indicate, at least in part, a direction, an orientation, or a combination thereof associated with the at least one parking location.

In step 407, the travel platform 109 causes, at least in part, a transmission of a request to present at least one notification to at least one operator of the at least one parked vehicle, at least one operator of the at least one other parked vehicle, or a combination thereof, regarding the at least one obstruction, the at least one anticipated movement, or a combination thereof. In one scenario, the notification may include, at least in part, a departure time for the at least one parked vehicle, obstruction information, information on alternative parking space, information on parking position, parking angle etc. In one scenario, the travel platform 109 may establish a communication session upon determining at least one potential conflict between the parked vehicles, whereby the travel platform 109 may alert the vehicle obstructing the pathways of other parked vehicle with proximity information, departure time information, or a combination thereof. In one scenario, the travel platform 109 may alarm the driver of at least one parked vehicle that the at least one parking location is not available based, at least in part, on the proximity information, departure time information, or a combination thereof. The travel platform 109 may cause a recommendation of one or more alternate parking location for the obstructing vehicles for minimizing blocking of the one or more parked vehicles.

Figure 5:
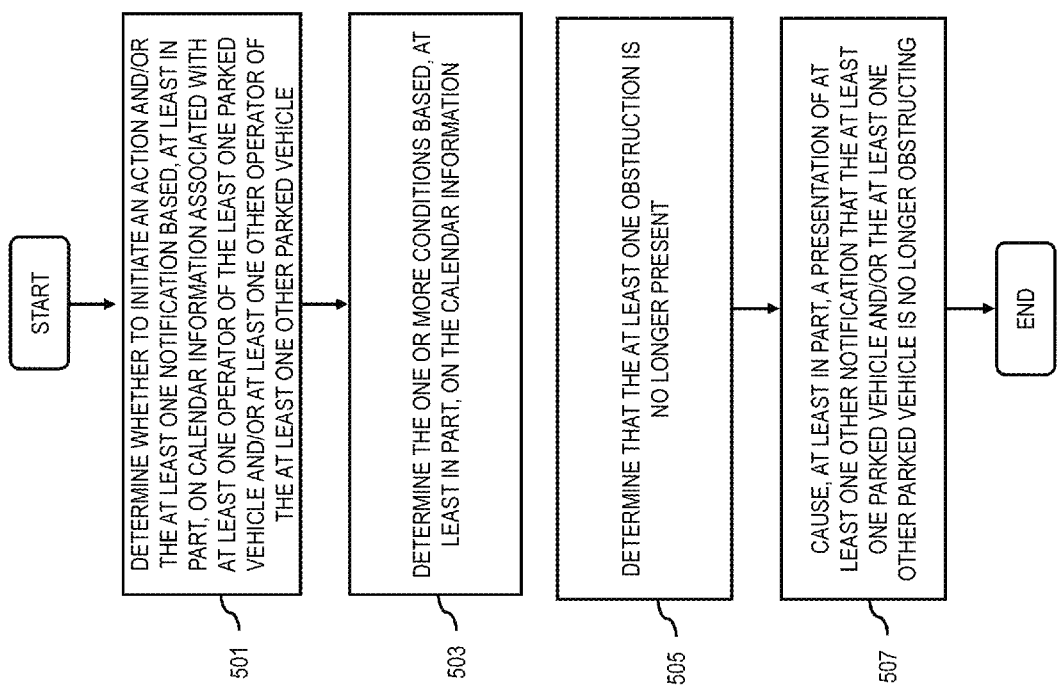

FIG. 5 is a flowchart of a process for determining one or more conditions based on calendar information, according to one embodiment. In one embodiment, the travel platform 109 performs the process 500 and is implemented in, for instance, a chip set including a processor and a memory as shown in FIG. 13.

In step 501, the travel platform 109 determines whether to initiate the at least one action, the at least one notification, or a combination thereof based, at least in part, on calendar information associated with at least one operator of the least one parked vehicle, at least one other operator of the at least one other parked vehicle, or a combination thereof. In one scenario, the travel platform 109 may determine at least one potential conflict between the parked vehicles, for instance, a parked vehicle may need to leave the parking location within few minutes from the parking location and the other parked vehicles obstructs the pathway, whereby the travel platform 109 may establish a communication session between the vehicles enabling exchange of sensor information and/or departure time information. The travel platform 109 may cause a presentation of at least one message in the at least one device associated with the one or more parked vehicles informing of the conflict in the parking situation.

In step 503, the travel platform 109 determines the one or more conditions based, at least in part, on the calendar information. In one scenario, the travel platform 109 may query the calendar information for departure time information for one or more parked vehicles, whereby the travel platform 109 may determine at least one obstruction, for instance, the travel platform 109 may determine that a parked vehicle is being obstructed by the other parked vehicle upon processing the calendar information and/or sensor information. The travel platform 109 may determine to establish a communication session if the exit for the parked vehicle is blocked during its scheduled departure time. In one scenario, the travel platform 109 may determine that there is no obstruction based on the calendar information, whereby the travel platform 109 may not cause a communication session, for instance, the travel platform 109 may query the information stores associated with the at least one parked vehicle and/or the at least one other parked vehicle, whereby the travel platform 109 may determine that the obstructing vehicle is departing the parking location before the scheduled departure time of the blocked vehicle.

In step 505, the travel platform 109 determines that the at least one obstruction is no longer present. In one scenario, vehicles have sensors that recognize the burdens in the vicinity, the data received from the sensors may be analyzed by the travel platform 109 to determine whether a parked vehicle may leave the parking location at a scheduled departure time. The sensors may do the sensing periodically, according to a schedule, on demand, or a combination thereof. In one scenario, the sensors may either sense before the departure time of a parked vehicle, or the driver of the parked vehicle may trigger the sensor observation, for instance, by using an application in her/his device. The travel platform 109 may determine the status of the blocking vehicle based, at least in part, on the analyzed data.

In step 507, the travel platform 109 causes, at least in part, a presentation of at least one other notification that the at least one parked vehicle, the at least one other parked vehicle, or a combination thereof, is no longer obstructing. In one scenario, the travel platform 109 may query the calendars information associated with one or more parked vehicles within a communication session for departure time information, and may determine at least one potential conflict. In one scenario, the travel platform 109 may determine at least one potential conflict between the parked vehicles, for instance, a parked vehicle may need to leave the parking location within few minutes from the parking location and the other parked vehicles obstructs the pathway, whereby the travel platform 109 may establish a communication session between the vehicles enabling exchange of sensor information and/or departure time information. The travel platform 109 may cause a presentation of at least one message in the at least one device associated with the one or more parked vehicles informing of the potential conflict in the parking situation. The travel platform 109 may guide the obstructing vehicle to a suitable parking location, whereby the travel platform 109 may cause a presentation of at least one notification of the removal of the obstruction to the owner of the blocked vehicle.

Figure 6:
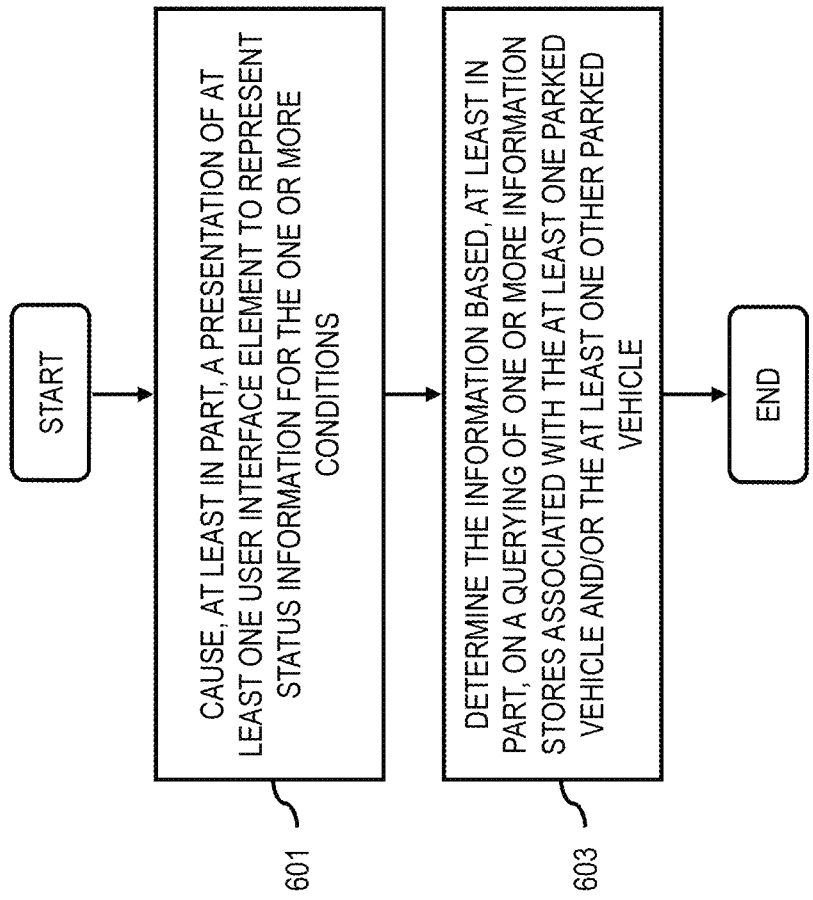

FIG. 6 is a flowchart of a process for determining the status of the one or more obstructing vehicles, and causing a presentation of the status information for the at least one obstruction, according to one embodiment. In one embodiment, the travel platform 109 performs the process 600 and is implemented in, for instance, a chip set including a processor and a memory as shown in FIG. 13.

In step 601, the travel platform 109 causes, at least in part, a presentation of at least one user interface element to represent status information for the one or more conditions, wherein the presentation of the at least one user interface element is based, at least in part, on calendar information associated with at least one operator of the at least one parked vehicle, at least one other operator of the at least one other parked vehicle, or a combination thereof. In one scenario, the travel platform 109 causes, at least in part, a presentation of at least one notification to at least one owner of the parked vehicle that the at least one other parked vehicle is no longer obstructing. In one scenario, the travel platform 109 may query the calendar information for at least one potential conflict between the one or more parked vehicles in the communication session, whereby the travel platform 109 may cause a presentation of any conflict at the least one user interface element on the at least one device associated with the one or more parked vehicles in the communication session. The driver of the vehicle may decide to move the vehicle upon receiving the information on conflict. In one scenario, the travel platform 109 may cause a presentation at the at least one device associated with the one or more parked vehicles in relation to the burdens in the vicinity of the vehicles, informing the owner of the at least one parked vehicle of the change in the parking situation. The travel platform 109 may provide status updates on parking situation to the owner of the one or more parked vehicles periodically, according to a schedule, on demand, or a combination thereof. In one scenario, a vehicle may be improperly parked, thereby blocking the exit for another vehicle that needs to leave the parking location, whereby the travel platform 109 may contact a service to have the blocking vehicle removed on time, for instance, the travel platform 109 may contact the towing services to have the blocking vehicle towed upon determining that the blocking vehicle has been unresponsive or cannot be reached.

In step 603, the travel platform 109 determines the information based, at least in part, on a querying of one or more information stores associated with the at least one parked vehicle, the at least one other parked vehicle, or a combination thereof.

Figure 7:
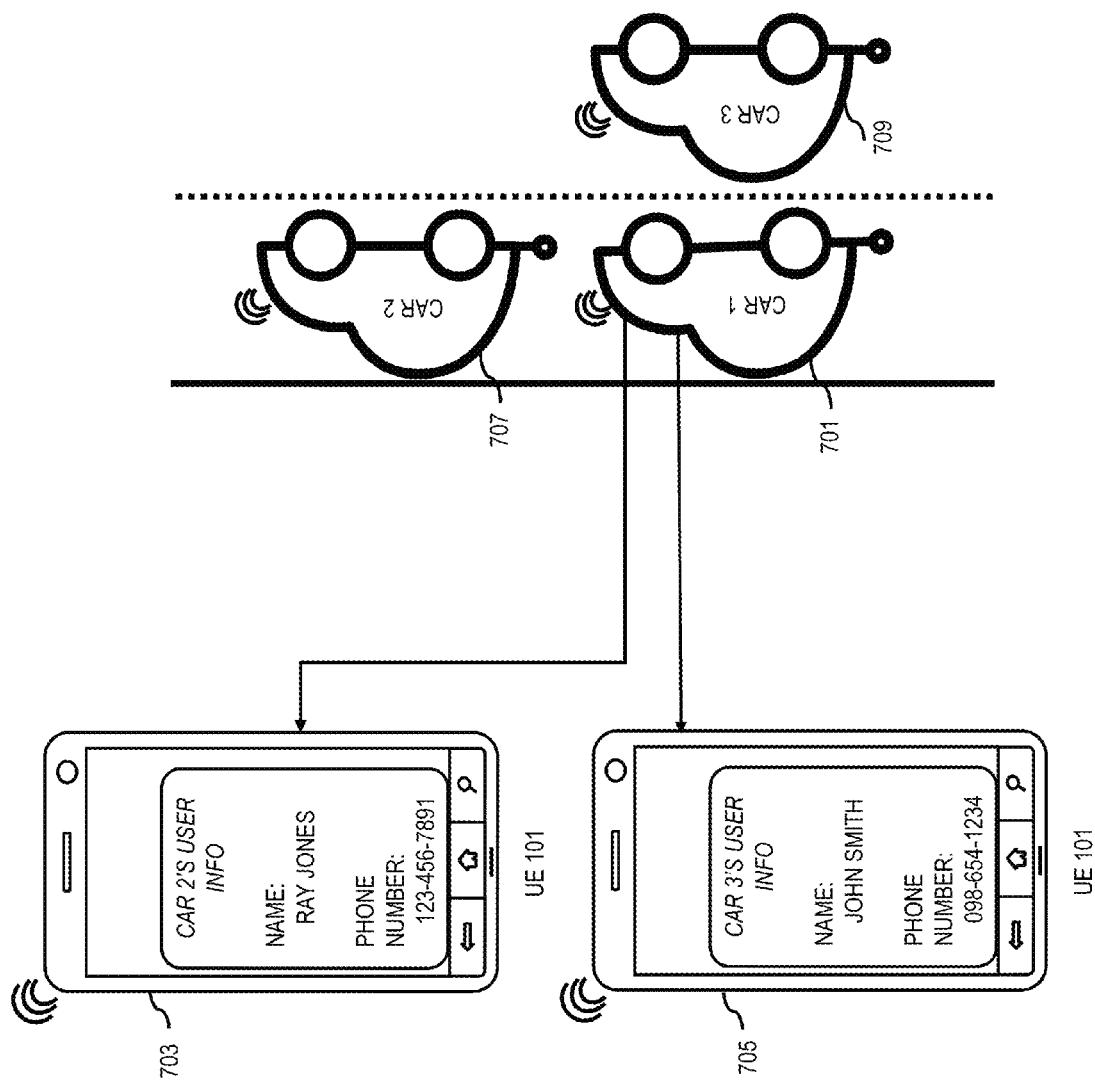
FIG. 7 is a pictorial representation of a vehicle and/or device associated with a vehicle having knowledge of contact information of the drivers of the one or more vehicles parked nearby, utilized in the process of FIGS. 3-6, according to one embodiment.

FIG. 7 is a pictorial representation of a vehicle and/or device associated with a vehicle having knowledge of contact information of the drivers of the one or more vehicles parked nearby, utilized in the process of FIGS. 3-6, according to one embodiment. The contact information for the driver's may include, for instance, phone numbers, among others. In one scenario, the at least one vehicle and/or the device associated with the at least one vehicle may have access to sensors, whereby the travel platform 109 may steer the vehicles towards at least one empty space between the one or more vehicles in the at least one parking location without any user interaction. In one scenario, the travel platform 109 may be utilized to locate the at least one vehicle that prevents one or more cars parked in the at least one parking location from departure, whereby the blocked vehicles may communicate with the blocking vehicles with regards to the vehicles being parked too close to each other, thereby not allowing the other vehicles to leave the parking location. As shows in FIG. 7, car 1 (701) and car 2 (707) are parked on a vertical parking space at the at least one parking location ensuring that either car may leave the parking location at any point of time. Later, car 3 (709) parks improperly, blocking the exit for car 1 (701), whereby car 1 (701) and/or device associated with car 1 (703 and 705) may communicate with car 3 (709) and/or device associated with car 3, over a wireless link to inform about the parking situation. In one scenario, car 1 (701) and/or the device associated with car 1 (703 and 705) may have access to contact information of the drivers of car 2 (707) and car 3 (709), whereby car 1 (701) and/or device associated with car 1 (703 and 705) may contact the drivers of car 2 (707) or car 3 (709) to move their cars, for car 1 (701) to leave the parking location. In one scenario, car 1 (701), car 2 (707) and car 3 (709) may have an in-built WiFi and/or cellular equipment with which they can communicate, for instance, one or more devices associated with the parked cars, either through WiFi or cellular or other radios. In one scenario, car 1 (701) may communicate its findings to the device of the driver of car 1 (701) and car 3 (709), and car 3 (709) can further communicate the information it has received from car 1 unanimously to the device of its driver, i.e., without driver's information of car 1 (701). In one scenario, travel platform 109 may initiate observation of the environment for the parked vehicles, for instance, travel platform 109 may initiate observation of the surrounding for car 1 upon determination that car 1 has been parked and the driver of car 1 has left the car. Further, such function may be used as per user's (or driver's) need, for instance, driver of car 1 may activate the observation of the environment for car 1 few minutes before the departure time, to ensure that his/her vehicle is free from obstruction.

Figure 8:
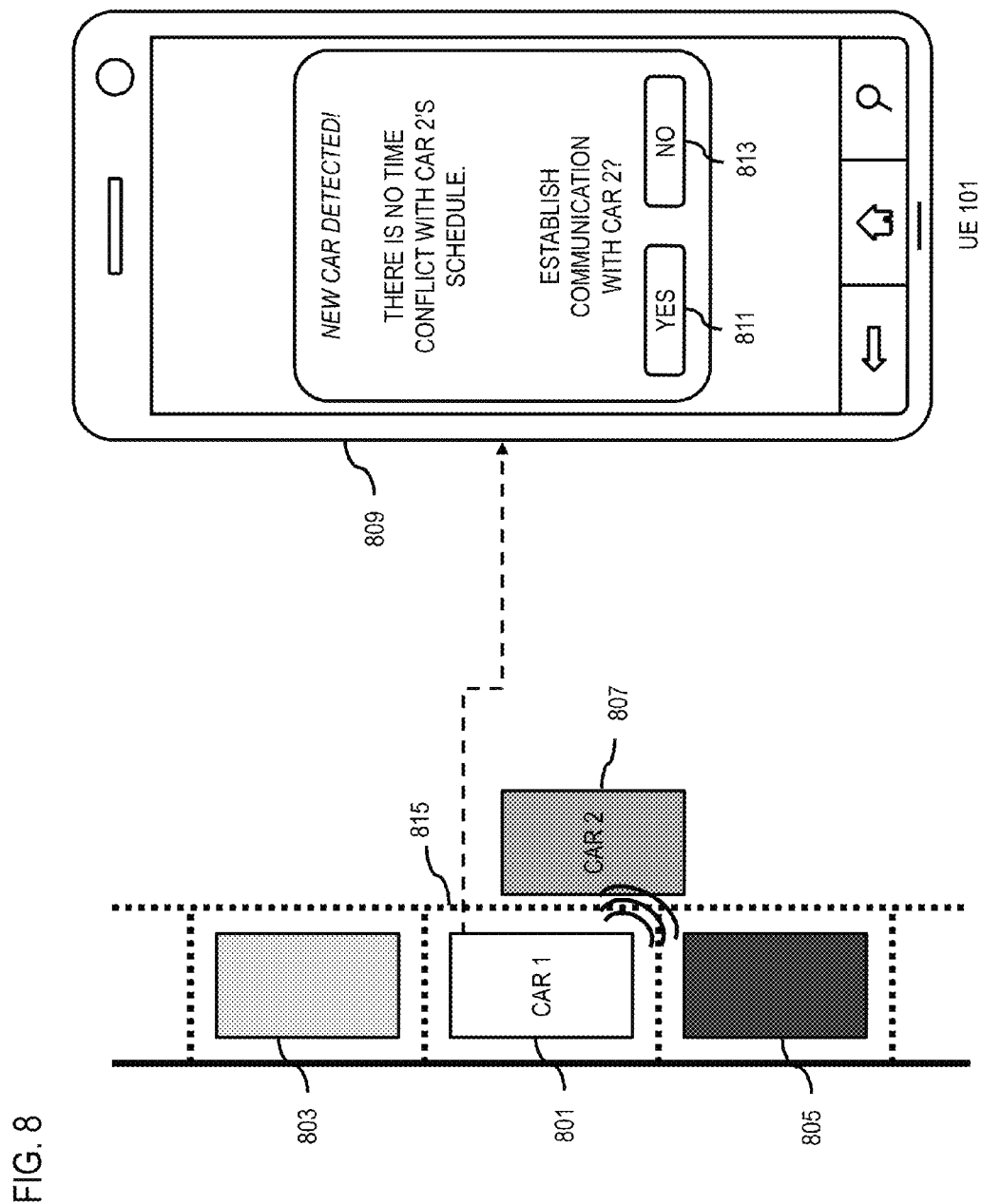
FIG. 8 is a diagram that represents a parking situation whereby the at least one parked vehicle and/or the device associated with the at least one parked vehicle determines an obstruction by another parked vehicle, utilized in the process of FIGS. 3-6, according to one embodiment.

FIG. 8 is a diagram that represents a parking situation whereby the at least one parked vehicle and/or the device associated with the at least one parked vehicle determines an obstruction by another parked vehicle, utilized in the process of FIGS. 3-6, according to one embodiment. Further, the travel platform 109 determines whether the at least one obstruction represents at least one potential conflict. In one scenario, car 1 (801) arrives at the parking location at 9:00 am and parks between two cars (803 and 805) at 815. At 10:00 am, car 2 (807) arrives and parks improperly next to car 1 (801). Then, car 1 (801) detects car 2 (807) through the proximity sensors, whereby the travel platform 109 may query the schedule of the driver of car 1 (801). The query may result the travel platform 109 to determine that the driver of car 1 (801) has no appointment during the day and only needs to go home at 5:00 pm. In one scenario, the travel platform 109 may not establish any communication session between car 1 (801) and car 2 (807) based, at least on part, on a determination that car 2 (807) is leaving the parking location before car 1 (801). In one scenario, the travel platform 109 may cause a presentation in the at least one device associated with car 1 (809) based, at least in part, on the calendar information, whereby the travel platform 109 may inform the driver of car 1 (801) that though car 2 (807) is improperly parked next to car 1 (801), car 2 (807) does not affect the scheduled departure of car 1 (801). In one scenario, a user may choose to establish a communication session with car 2 (811) or refuse to establish a communication session based on the parking situation (813). In one scenario, car 1 may cause a display based, at least in part, on the calendar information, the time it is going to leave a parking location. Such display may be visible to the other drivers parking nearby car 1. In one scenario, car 1 may cause a display of the departure time information, for instance, 'next planned departure at 17:30', for the other drivers parking nearby to see, whereby the other drivers may decide whether to park their cars nearby car 1 as per their schedule.

Figure 9:
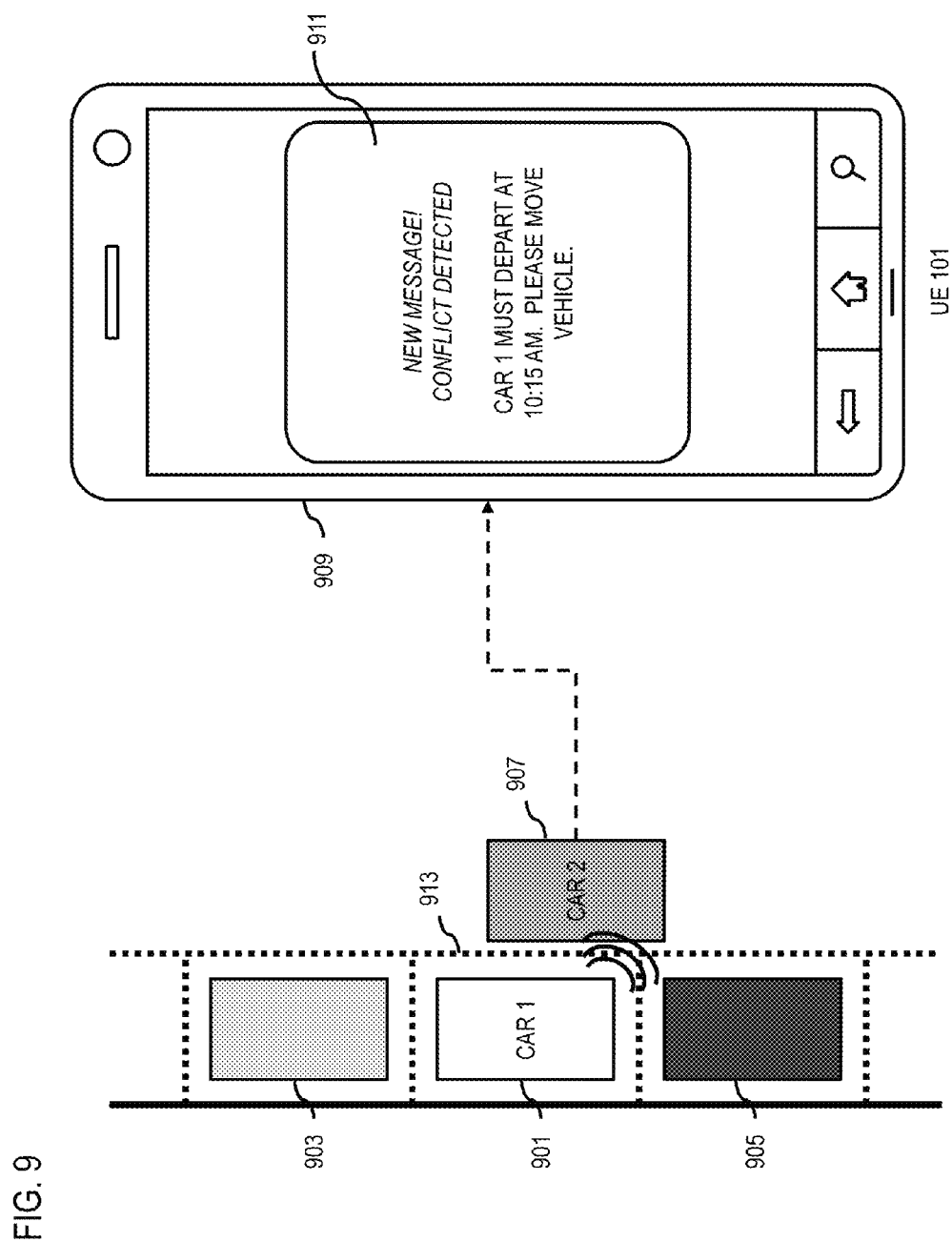
FIG. 9 is a diagram that represents a parking situation whereby the at least one parked vehicle and/or the device associated with the at least one parked vehicle determines at least one potential conflict for an anticipated movement of the at least one parked vehicle, utilized in the process of FIGS. 3-6, according to one embodiment.

FIG. 9 is a diagram that represents a parking situation whereby the at least one parked vehicle and/or the device associated with the at least one parked vehicle determines at least one potential conflict for an anticipated movement of the at least one parked vehicle, utilized in the process of FIGS. 3-6, according to one embodiment. In one scenario, in case of conflicts, vehicles have sensors which can recognize, for instance, the burdens in the vicinity of the at least one vehicle. The data received from the sensors can be analyzed to see whether or not a vehicle can leave its parking location. A vehicle can do the sensing periodically, according to a schedule, on demand, user's (or driver's) need or a combination thereof, and based on the analyzed data may trigger communication to the vehicles nearby. The at least one device associated with the blocked vehicles may communicate the situation to the driver of the blocking vehicle, upon receiving the information the driver of the blocking vehicle may decide whether or not to move the car. If the blocking vehicle departs from the parking location, such information may be relayed to the driver of the blocked vehicle. In one scenario, car 1 (901) arrives at the parking location at 9:00 am, and parks between two cars (903 and 905) at 913. Later, at 10:00 am, car 2 (907) arrives and parks improperly next to car 1 (901), thereby blocking the exit for car 1 from the parked area (1017). Car 1 (901) detects car 2 (907) through the proximity sensors, whereby the travel platform 109 may query the schedule of the driver of car 1 (801). The query may result the travel platform 109 to determine that the driver of car 1 (901) has to leave the parking location at 10:15 am. Subsequently, the travel platform 109 may establish a communication session between car 1 (901) and car 2 (907) to inform about the at least one potential conflict. In one scenario, the driver of car 2 (907) may receive a message in the at least one device (909) associated with car 2 (907) informing him/her that a conflict is detected between car 2 (907) and car 1 (901) because car 1 (901) needs to depart the parking location in couple of minutes, and car 2 (907) is blocking the pathway (911), whereby the driver of car 2 (907) may temporarily move car 2 (907) for car 1 (901) to leave the parking location, and may occupy the parking location of car 1 (801). In one scenario, the travel platform 109 may notify the device associated with Car 1 when car 2 (907) is moved, informing that the path is now open for Car 1 to leave the parking location.

Figure 10:
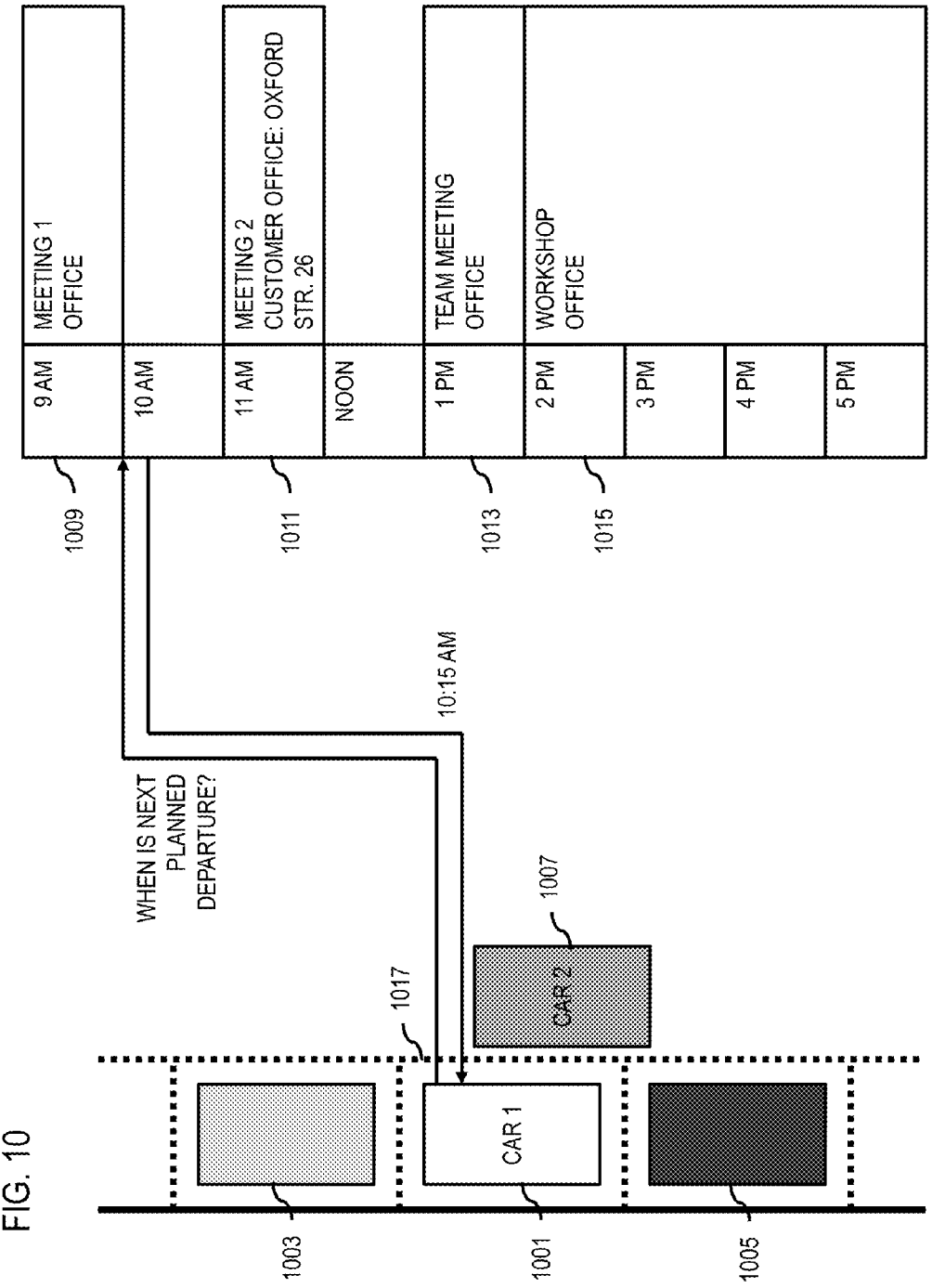
FIG. 10 is a diagram that represents a parking situation whereby the at least one device associated with the one or more parked vehicle queries at least one calendar information associated with at least one operator of that least one parked vehicle, utilized in the process of FIGS. 3-6, according to one embodiment.

FIG. 10 is a diagram that represents a parking situation whereby the travel platform 109 queries at least one calendar information associated with at least one operator of that least one parked vehicle, utilized in the process of FIGS. 3-6, according to one embodiment. In one scenario, travel platform 109 determines an obstruction, for instance, the pathway (1017) of car 1 (1001) is being blocked by car 2 (1007). The travel platform 109 further determines whether the obstruction represents at least one potential conflict, whereby the travel platform 109 may query at least one calendar information associated with at least one operator of that least one parked vehicle periodically, according to a schedule, on demand, user's (or driver's) need, or a combination thereof (1009, 1011, 1013 and 1015). The travel platform 109 may process the information to determine calendar information for at least one potential conflict, whereby the travel platform 109 determines that car 1 (1001) has to leave the parking location 1017 at 9 am, 11 am, 1 pm and 2 pm. The travel platform 109 may notify the driver of car 2 (1007) about the at least one potential conflict, for instance, by sending a message in the at least one device associated with car 2 (1007) informing the driver of car 2 about the departure time information for car 1 (1001). In one scenario, the calendar application may further illustrate the parking needs for a vehicle by using special icon or so in the user interface. In one embodiment, car 2 (1007) may park in the parking location of car 1 (1001) during the time the calendar shows that the car 1 (1001) should be away from its parking location. In addition, car 2 (1007) may be informed on when it should leave the parking location to enable the car 1 (1001) to park properly on time.

Figure 11:
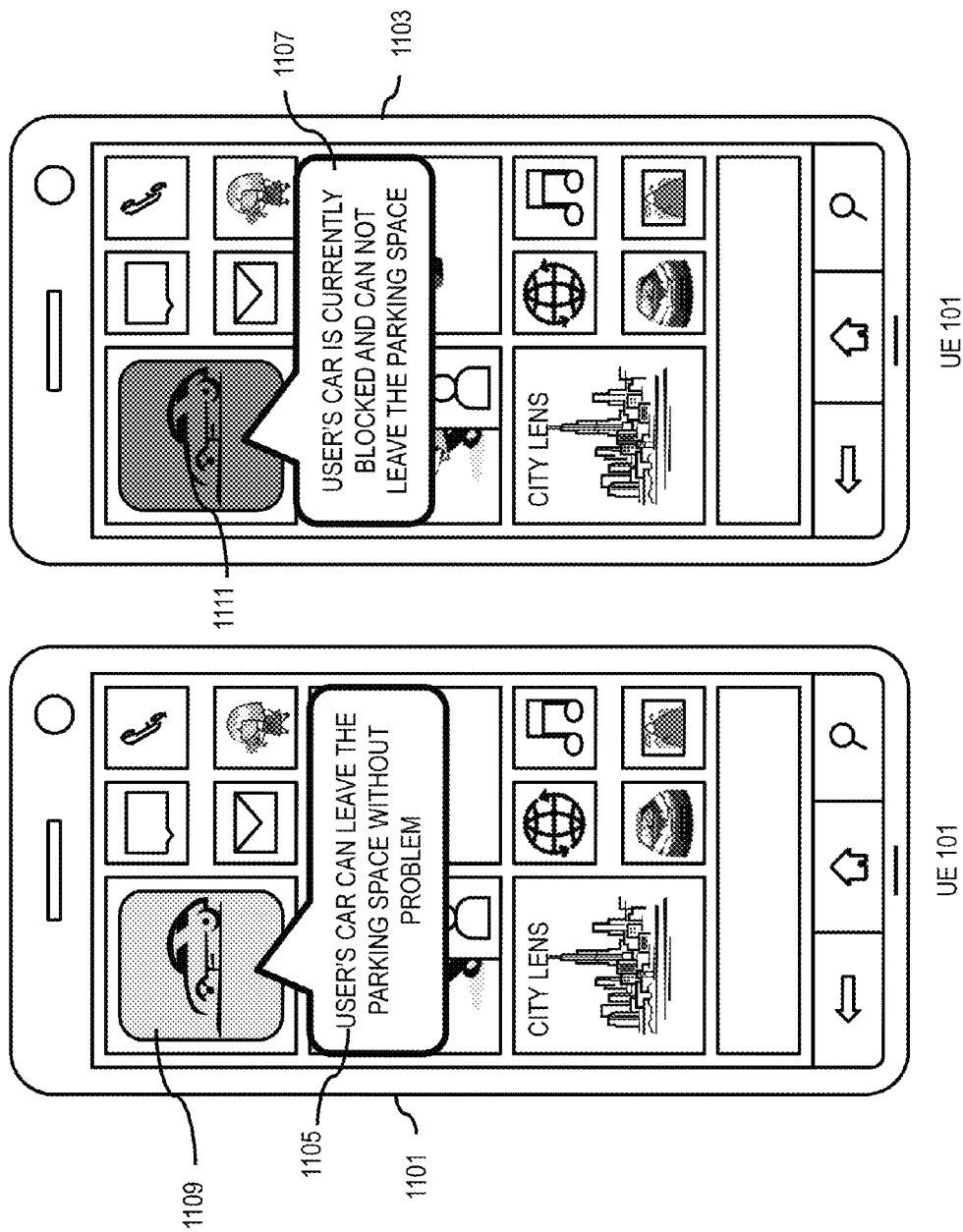
FIG. 11A-11C are diagrams of user interfaces utilized in the processes of FIGS. 3-6, according to one embodiment.

FIG. 11A is a diagram of a user interface utilized in the process of FIGS. 3-6, according to one embodiment. In one scenario, the travel platform 109 causes, at least in part, a presentation of at least one user interface element (1109, 1111) on the at least one device associated with one or more parked vehicles representing the status information for the at least one obstruction. In one scenario, the UE 101 (1101 and 1103) associated with the at least one parked vehicle may present the driver of the parked vehicle with the information on the status of the obstruction (1105 and 1107). In one scenario, the driver of the parked vehicle may be in a different location, for instance, office, whereby he/she is automatically informed if his/her vehicle is being blocked by another vehicle (1107). The driver of the blocked vehicle may choose to contact the driver of the blocking vehicle to move his/her car or may choose to wait for the status updates till the time of departure. In one embodiment, by clicking or tapping the user interface element 1108, a user can be provided with more status information. For instance, a user may have the option to access settings, review the schedule of the blocking time, change the departure time information, activate the sensors to detect any blocking vehicles, i.e., if the vehicle in the front and the back of a parked vehicle are parked too close, thereby blocking the exit of the parked vehicle. In one scenario, the sensors of the parked vehicles observes the nearby environment, and the sensors may determine that there is an obstruction for a parked vehicle based, at least in part, on calculation of the sensor information on whether or not there is enough free space nearby, for instance, it compares the logic of whether there is enough free space for a parked vehicle to leave the parking location. Such sensor information is fed to the travel platform 109, whereby the travel platform 109 suggests the application 1109 to communicate with the driver of the parked vehicles.

FIG. 11B is a diagram of a user interface utilized in the process of FIGS. 3-6, according to one embodiment. In one scenario, the travel platform 109 causes, at least in part, a presentation of at least one user interface element (1117, 1119) on the at least one device associated with one or more parked vehicles representing the status information for the parking situation. In one scenario, a user may tap on the user interface element (1117), whereby the UE 101 associated with the at least one parked vehicle may prompt the driver of the parked vehicle whether he/she wants to check the cars parking situation. The UE 101 may present the user with information on the parking situation (1115) based on the driver's response. In one scenario, a more user friendly approach may be implemented whereby the user need not interact with the display presented in the UE 101 (1113, 1117), the travel platform 109 may cause a presentation of parking status information upon determining that the at least one parked vehicle is being blocked by the at least one other parked vehicle. In this manner, the UE 101 may change its view from 1113 and 1117 to 1119 and 1115 without user interaction, thereby enhancing user convenience.

FIG. 11C is a diagram of a user interface utilized in the process of FIGS. 3-6, according to one embodiment. In one scenario, the travel platform 109 may determine, based at least in part, on calendar information, a parked vehicle is blocked, whereby the UE 101 associated with the at least one parked vehicle may prompt the driver of the parked vehicle, if he/she wants to check the parking situation, for instance, when the parked vehicle is not blocked. The driver may respond by tapping the user interface element 1129, whereby the UE 101 may present the user with information (1127) on the when the parked vehicle is free to leave the parking location.

The processes described herein for determining one or more conditions of the at least one anticipated movement of the at least one parked vehicle may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
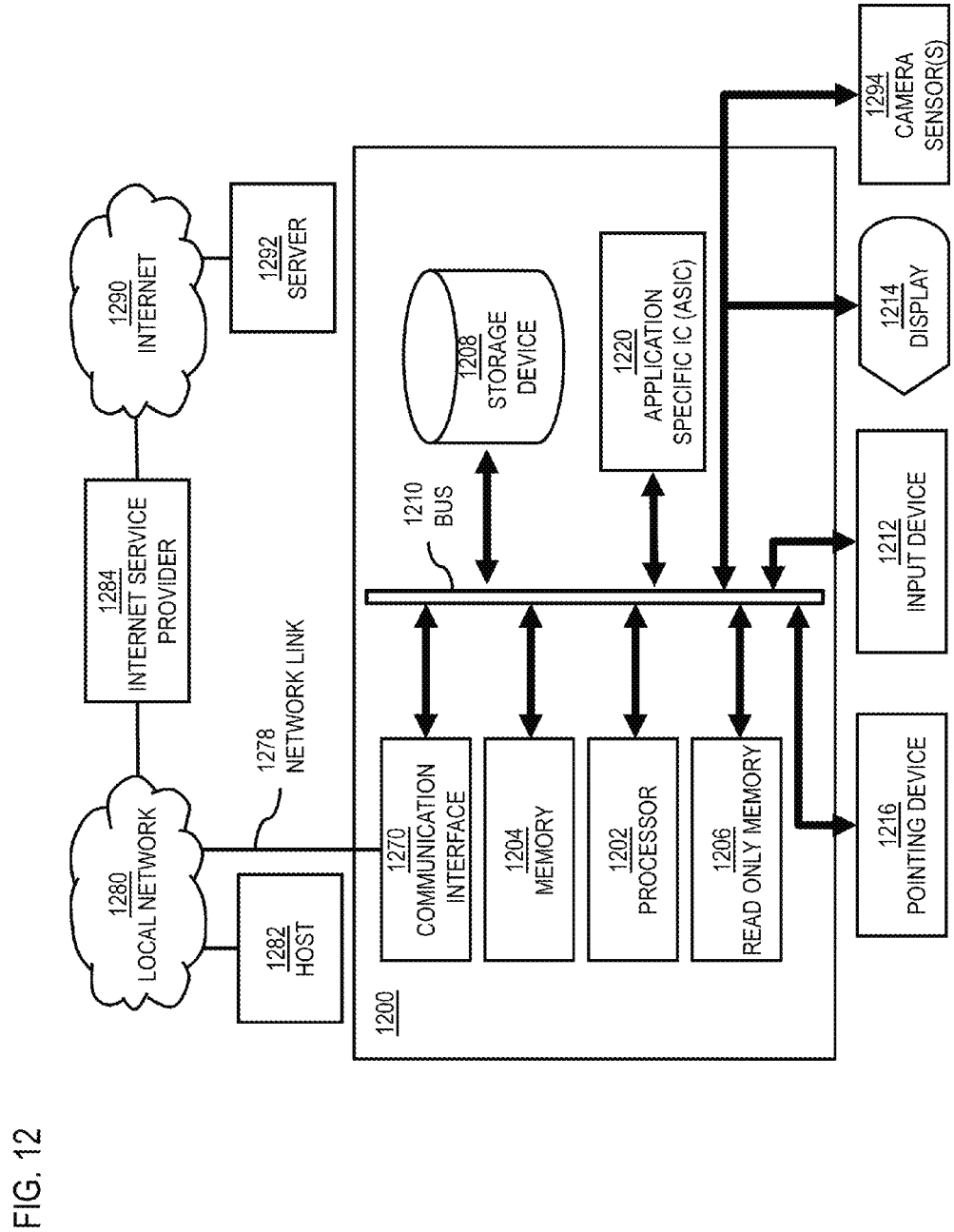
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to determine one or more conditions of the at least one anticipated movement of the at least one parked vehicle as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of determining one or more conditions of the at least one anticipated movement of the at least one parked vehicle.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to determine one or more conditions of the at least one anticipated movement of the at least one parked vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for determining one or more conditions of the at least one anticipated movement of the at least one parked vehicle. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for determining one or more conditions of the at least one anticipated movement of the at least one parked vehicle is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for determining one or more conditions of the at least one anticipated movement of the at least one parked vehicle to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to determine one or more conditions of the at least one anticipated movement of the at least one parked vehicle, as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of determining one or more conditions of the at least one anticipated movement of the at least one parked vehicle.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to determine one or more conditions of the at least one anticipated movement of the at least one parked vehicle. The memory 1305 also stores the data associated with or generated by the execution of the inventive steps.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of determining one or more conditions of the at least one anticipated movement of the at least one parked vehicle. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices. In one embodiment, vehicles may have in-built mobile terminal functions.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of determining one or more conditions of the at least one anticipated movement of the at least one parked vehicle. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to determine one or more conditions of the at least one anticipated movement of the at least one parked vehicle. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the method comprising:
    sensing of information with at least one sensor, wherein the information is associated with at least one anticipated movement of the at least one parked vehicle;
    processing of the information to determine one or more conditions of the at least one anticipated movement of the at least one parked vehicle; and
    initiation of at least one action based, at least in part, on the one or more conditions, the at least one anticipated movement, or a combination thereof;
    wherein the at least one action includes, at least in part, (a) an establishment of at least one communication session between at least one device associated with the at least one parked vehicle and at least one other device associated with at least one other parked vehicle; or (b) a determination that at least one communication session is not needed based, at least in part, on the one or more conditions.

2. A method of claim 1, further comprising:
    an exchange of the one or more conditions over the at least one communication session,
    wherein the one or more conditions are for determining one or more possibilities of the anticipated movement of the at least one parked vehicle.

3. A method of claim 1, further comprising:
    at least one determination that the at least one parked vehicle, at least one other parked vehicle, or a combination thereof, represents at least one obstruction; and
    a transmission of a request to present at least one notification to at least one operator of the at least one parked vehicle, at least one operator of the at least one other parked vehicle, or a combination thereof, regarding the at least one obstruction, the at least one anticipated movement, or a combination thereof.

4. A method of claim 3, further comprising:
    at least one determination of whether to initiate the at least one action, the at least one notification, or a combination thereof based, at least in part, on calendar information associated with at least one operator of the least one parked vehicle, at least one other operator of the at least one other parked vehicle, or a combination thereof.

5. A method of claim 4, further comprising:
    at least one determination of the one or more conditions based, at least in part, on the calendar information.

6. A method of claim 3, further comprising:
    at least one determination that the at least one obstruction is no longer present; and
    a presentation of at least one other notification that the at least one parked vehicle, the at least one other parked vehicle, or a combination thereof is no longer obstructing.

7. A method of claim 1, further comprising:
a presentation of at least one user interface element to represent status information for the one or more conditions.

8. A method of claim 7, wherein the presentation of the at least one user interface element is based, at least in part, on calendar information associated with at least one operator of the at least one parked vehicle, at least one other operator of the at least one other parked vehicle, or a combination thereof.

9. A method of claim 1, further comprising:
at least one determination of the information based, at least in part, on a querying of one or more information stores associated with the at least one parked vehicle, the at least one other parked vehicle, or a combination thereof.

10. An apparatus comprising:
at least one processor; and
at least one memory including computer program code for one or more programs,
the at least one memory and the computer program code configured to, with the at least one processor, cause the apparatus to perform at least the following,
cause, at least in part, a sensing of information with at least one sensor, wherein the information is associated with at least one anticipated movement of the at least one parked vehicle;
process and/or facilitate a processing of the information to determine one or more conditions of the at least one anticipated movement of the at least one parked vehicle; and
cause, at least in part, an initiation of at least one action based, at least in part, on the one or more conditions, the at least one anticipated movement, or a combination thereof;
wherein the at least one action includes, at least in part, (a) an establishment of at least one communication session between at least one device associated with the at least one parked vehicle and at least one other device associated with at least one other parked vehicle; or (b) a determination that at least one communication session is not needed based, at least in part, on the one or more conditions.

11. An apparatus of claim 10, wherein the apparatus is further caused to:
cause, at least in part, the establishment of the at least one communication session; and
cause, at least in part, an exchange of the one or more conditions over the at least one communication session,
wherein the one or more conditions are for determining one or more possibilities of the anticipated movement of the at least one parked vehicle.

12. An apparatus of claim 10, wherein the apparatus is further caused to:
determine that the at least one parked vehicle, at least one other parked vehicle, or a combination thereof, represents at least one obstruction; and
cause, at least in part, a transmission of a request to present at least one notification to at least one operator of the at least one parked vehicle, at least one operator of the at least one other parked vehicle, or a combination thereof, regarding the at least one obstruction, the at least one anticipated movement, or a combination thereof.

13. An apparatus of claim 12, wherein the apparatus is further caused to:
determine whether to initiate the at least one action, the at least one notification, or a combination thereof based, at least in part, on calendar information associated with at least one operator of the least one parked vehicle, at least one other operator of the at least one other parked vehicle, or a combination thereof.

14. An apparatus of claim 13, wherein the apparatus is further caused to:
determine the one or more conditions based, at least in part, on the calendar information.

15. An apparatus of claim 12, wherein the apparatus is further caused to:
determine that the at least one obstruction is no longer present; and
cause, at least in part, a presentation of at least one other notification that the at least one parked vehicle, the at least one other parked vehicle, or a combination thereof, is no longer obstructing.

16. An apparatus of claim 10, wherein the apparatus is further caused to:
cause, at least in part, a presentation of at least one user interface element to represent status information for the one or more conditions.

17. An apparatus of claim 16, wherein the presentation of the at least one user interface element is based, at least in part, on calendar information associated with at least one operator of the at least one parked vehicle, at least one other operator of the at least one other parked vehicle, or a combination thereof.

18. An apparatus of claim 10, wherein the apparatus is further caused to:
determine the information based, at least in part, on a querying of one or more information stores associated with the at least one parked vehicle, the at least one other parked vehicle, or a combination thereof.

* * * * *